(12) United States Patent
Caine et al.

(10) Patent No.: US 9,761,336 B2
(45) Date of Patent: Sep. 12, 2017

(54) INSULATED SOLUTION INJECTOR, SYSTEM INCLUDING THE SAME, AND METHOD OF INJECTING USING THE SAME

(71) Applicants: Thomas Alfred Caine, Sunol, CA (US); Russell Alexander Seeman, Sunol, CA (US)

(72) Inventors: Thomas Alfred Caine, Sunol, CA (US); Russell Alexander Seeman, Sunol, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 267 days.

(21) Appl. No.: 13/722,182

(22) Filed: Dec. 20, 2012

(65) Prior Publication Data

US 2014/0175186 A1    Jun. 26, 2014

(51) Int. Cl.
| G21C 19/28 | (2006.01) |
| F16L 41/08 | (2006.01) |
| B05B 1/24 | (2006.01) |
| B05B 1/28 | (2006.01) |
| G21C 17/022 | (2006.01) |

(52) U.S. Cl.
CPC .............. *G21C 19/28* (2013.01); *B05B 1/24* (2013.01); *B05B 1/28* (2013.01); *F16L 41/082* (2013.01); *G21C 17/0225* (2013.01)

(58) Field of Classification Search
CPC ............. F16L 55/00; G21C 19/28; B05B 1/28
USPC .......................... 137/896, 375, 602, 377, 378
See application file for complete search history.

(56) References Cited

U.S. PATENT DOCUMENTS

| 950,295 A * | 2/1910 | Marsden ...................... 137/212 |
| 1,243,892 A | 10/1917 | Strong |
| 1,496,345 A | 6/1924 | Lichtenthaeler |
| 2,816,518 A * | 12/1957 | Daggett ..................... 222/145.6 |
| 3,307,567 A * | 3/1967 | Gogarty et al. ................. 137/13 |
| 3,606,166 A | 9/1971 | Whear |

(Continued)

FOREIGN PATENT DOCUMENTS

| CA | 2438988 A1 | 9/2002 |
| DE | 202007015225 U1 | 1/2008 |

(Continued)

OTHER PUBLICATIONS

U.S. Appl. No. 13/340,918, filed Dec. 30, 2011.

(Continued)

*Primary Examiner* — Michael R Reid
*Assistant Examiner* — Christopher Ballman
(74) *Attorney, Agent, or Firm* — Harness, Dickey & Pierce, P.L.C.

(57) ABSTRACT

An insulated solution injector may include an outer tube and an inner tube arranged within the outer tube. The outer tube and the inner tube may define an annular space therebetween, and the inner tube may define a solution space within. The annular space may be configured so as to insulate the solution within the solution space. As a result, the solution may be kept to a temperature below its decomposition temperature prior to injection. Accordingly, the decomposition of the solution and the resulting deposition of its constituents within the solution space may be reduced or prevented, thereby decreasing or precluding the occurrence of a blockage.

20 Claims, 10 Drawing Sheets

(56) References Cited

U.S. PATENT DOCUMENTS

| | | | |
|---|---|---|---|
| 3,794,299 A | | 2/1974 | Wagner et al. |
| 4,198,815 A | * | 4/1980 | Bobo et al. .................. 60/737 |
| 4,442,047 A | * | 4/1984 | Johnson ........................ 261/66 |
| 4,564,298 A | | 1/1986 | Gritters et al. |
| 4,696,324 A | * | 9/1987 | Petronko ...................... 137/375 |
| 4,735,044 A | * | 4/1988 | Richey et al. ................. 60/742 |
| 4,834,343 A | | 5/1989 | Boyes |
| 4,861,165 A | | 8/1989 | Fredriksson et al. |
| 5,105,843 A | * | 4/1992 | Condron et al. ............... 137/13 |
| 5,239,773 A | * | 8/1993 | Doolittle, Jr. ................. 47/57.5 |
| 5,356,213 A | | 10/1994 | Arpentinier |
| 5,444,747 A | | 8/1995 | Terhune |
| 5,607,626 A | * | 3/1997 | Kunkle ................. F22G 5/123 261/116 |
| 5,625,656 A | | 4/1997 | Hettiarachchi et al. |
| 5,692,684 A | * | 12/1997 | Zurmuhlen .......... B05B 1/1672 239/563 |
| 5,818,893 A | | 10/1998 | Hettiarachchi |
| 6,035,886 A | * | 3/2000 | Kerr ............................ 137/360 |
| 6,165,372 A | | 12/2000 | Ziemer et al. |
| 6,659,636 B1 | | 12/2003 | Matula |
| 6,869,213 B2 | | 3/2005 | Cappellino |
| 7,137,569 B1 | | 11/2006 | Miller et al. |
| 7,943,099 B2 | | 5/2011 | Strebelle et al. |
| 8,753,044 B2 | * | 6/2014 | Greenwood et al. ......... 406/108 |
| 9,028,767 B2 | | 5/2015 | Rasanen et al. |
| 2002/0101953 A1 | | 8/2002 | Hettiarachchi et al. |
| 2002/0179739 A1 | * | 12/2002 | Kunkle ................. B05B 1/3006 239/453 |
| 2006/0272332 A1 | | 12/2006 | Moraes |
| 2007/0251888 A1 | * | 11/2007 | Matula ......................... 210/752 |
| 2009/0086878 A1 | | 4/2009 | Stellwag et al. |
| 2009/0154636 A1 | | 6/2009 | Tran et al. |
| 2010/0055308 A1 | | 3/2010 | Dulka et al. |
| 2010/0116512 A1 | | 5/2010 | Henry |
| 2012/0298216 A1 | * | 11/2012 | Geertsen ....................... 137/340 |
| 2014/0140465 A1 | | 5/2014 | Ishida et al. |

FOREIGN PATENT DOCUMENTS

| | | |
|---|---|---|
| EP | 2395130 A1 | 12/2011 |
| ES | 2132074 T3 | 8/1999 |
| ES | 2162895 T3 | 1/2002 |
| GB | 718760 A | 11/1954 |
| JP | 53-7403 U | 1/1978 |
| JP | 2000509149 A | 7/2000 |
| JP | 2007120755 A | 5/2007 |
| JP | 2009145348 A | 7/2009 |
| TW | 200926204 A | 6/2009 |
| TW | 201015585 A | 4/2010 |
| WO | WO-99/17302 A1 | 4/1999 |
| WO | WO-2004056487 A1 | 7/2004 |
| WO | WO-2009065220 A1 | 5/2009 |
| WO | WO-2014133618 A2 | 9/2014 |

OTHER PUBLICATIONS

Invitation to Pay Additional Fees issued by the International Searching Authority, mailed Sep. 11, 2014 and issued in International Application No. PCT/US2013/073800.

Handbook of Hydraulic Resistance, AEC-tr-6630. Accession No. ML12209A041. Dec. 31, 1960. pp. 26-27. publicly available: http://pbadupws.nrc.gov/docs/ML1220/ML12209A041.pdf>L1220/ML12209A041.pdf>.

Japanese Office Action issued in Japanese Application No. 2012-277546 dated Nov. 25, 2014.

Unofficial English Translation of an ES Search Report and Written Opinion dated Feb. 21, 2014 issued in connection with corresponding ES Patent Application No. 201231964.

MX Office Action issued in connection with corresponding MX Patent Application No. MX/a/2012/014745 dated Aug. 19, 2013.

International Search Report and Written Opinion issued in connection with corresponding PCT Application No. PCT/US2016/58556 dated Jan. 19. 2017.

U.S. Office Action mailed Dec. 22, 2016, issued in co-pending U.S. Appl. No. 13/340,918.

Taiwan Notice of Allowance issued on Jul. 29, 2016 for corresponding TW Application No. 101148521.

International Search Report and Written Opinion dated Nov. 28, 2014, issued in International Application No. PCT/US2013/073800.

\* cited by examiner

FIG. 1

CONVENTIONAL ART

FIG. 2

CONVENTIONAL ART

INSULATED SOLUTION INJECTOR, SYSTEM INCLUDING THE SAME, AND METHOD OF INJECTING USING THE SAME

BACKGROUND

Field

The present disclosure relates to devices, systems, and methods directed to the injection of solutions into a high-temperature environment.

Description of Related Art

Figure 1:
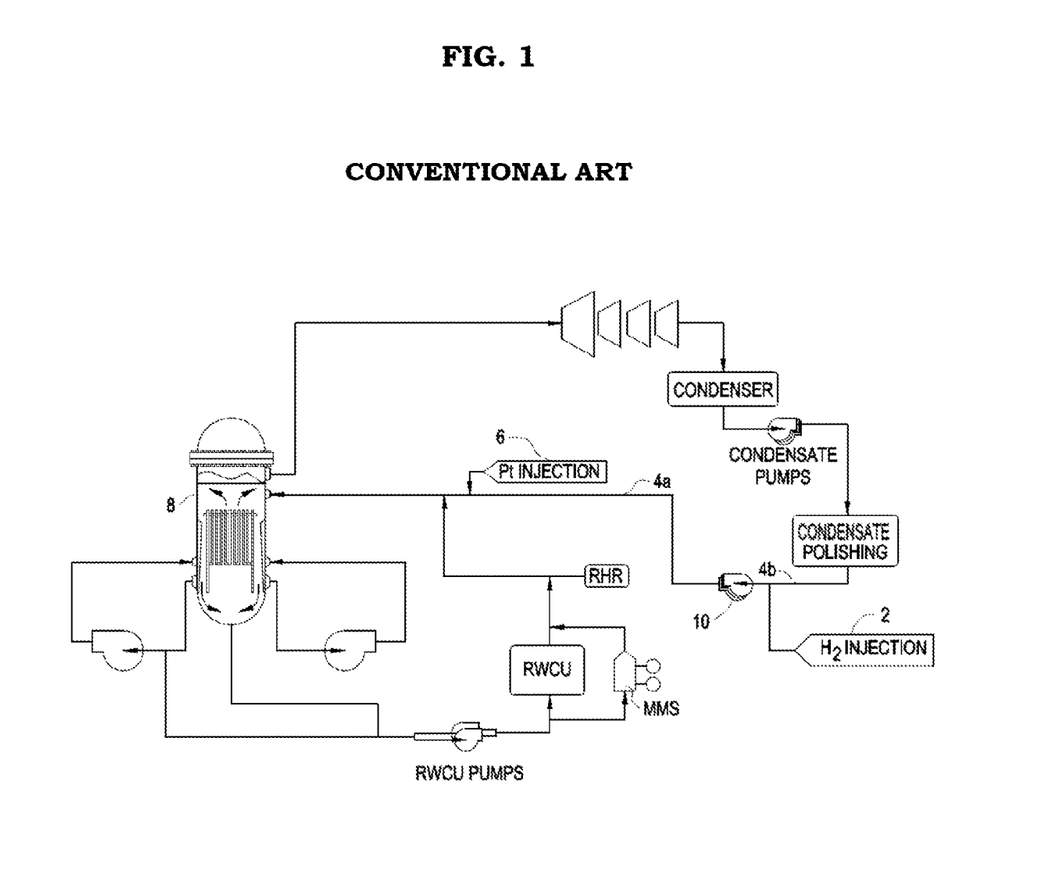
FIG. 1 is a schematic view of a conventional boiling water nuclear reactor (BWR) including deposition solution injection.

In a nuclear reactor, deposition solutions are often injected into a high temperature/pressure feed-water line in order to deposit materials on reactor surfaces. FIG. 1 is a schematic view of a conventional boiling water nuclear reactor (BWR) including deposition solution injection. Referring to FIG. 1, a hydrogen injection system 2 may be used to inject hydrogen into a feed-water suction line 4b (the suction line 4b is the inlet to feed-water pumps 10) to act as an oxygen scavenger for the water circulating in the reactor 8. In conjunction with the hydrogen injection system 2, a noble metal (e.g., platinum) deposition solution injection system 6 may be used to inject a deposition solution into the feed-water discharge line 4a in order to deposit platinum ions on surfaces of the reactor 8. While the reactor 8 is depicted as a Boiling Water Reactor (BWR) in FIG. 1, it should be understood that other types of nuclear reactors could also make use of deposition solution injections (such as the platinum deposition solution described herein). The platinum deposition solution may be, for example, a platinum salt solution of sodium hexahydroxyplatinate ($Na_2Pt(OH)_6$). By injecting the solution into the feed-water discharge line 4a, platinum ions may deposit onto surfaces of the reactor 8 so that the platinum may act as a catalyst to react the injected hydrogen with oxygen molecules that may be present in the reactor. By causing hydrogen to react with oxygen molecules on surfaces of the reactor 8, water ($H_2O$) molecules may be produced. This reaction acts to reduce and potentially eliminate oxygen molecules present on surfaces of the reactor 8 that may otherwise promote corrosion of metal components, thereby extending the useful life of reactor components.

Figure 2:
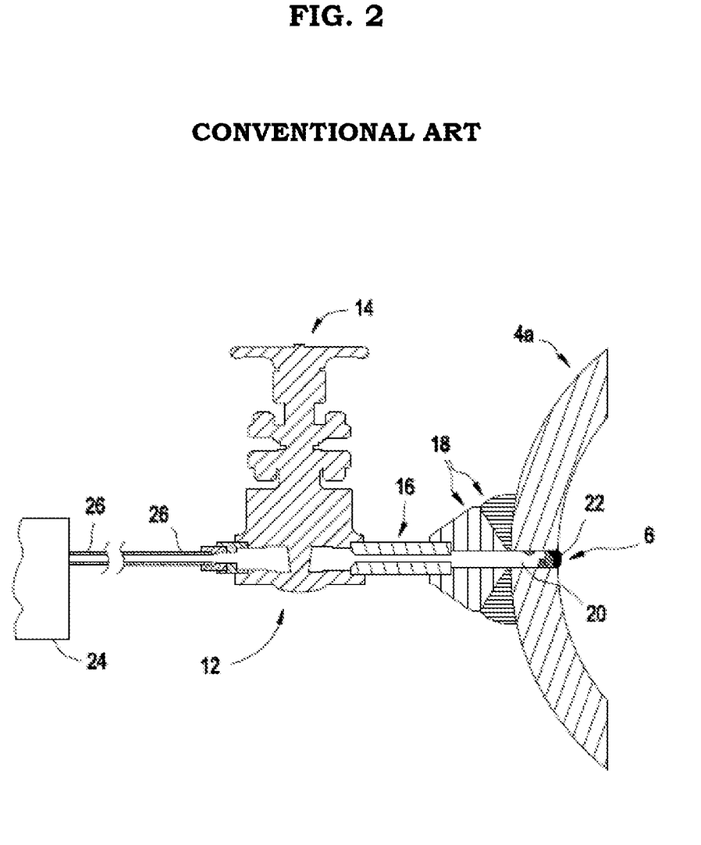
FIG. 2 is a side, cross-sectional view of a conventional deposition solution injector configuration.

FIG. 2 is a side, cross-sectional view of a conventional deposition solution injector configuration. Referring to FIG. 2, a conventional deposition solution injector configuration 12 may include a chemical feed skid 24 supplying a deposition solution to the feed-water discharge line 4a. The chemical feed skid 24 typically provides the chemical deposition solution at ambient temperatures with a flow-rate of around 50-120 $cm^3$/minute and a pressure typically less than 1250 psi (via positive displacement pumps). A chemical feed line 26 may provide the deposition solution from the chemical feed skid 24 to the injection tap 20. One or more injector valves 14 may be included in the chemical feed line 26 to provide a shutoff for the deposition solution in the chemical feed line 26. Typically, a pipe stub 16 is included at the injector valve 14 discharge. A weldment 18 may connect the injection tap 20 to the pipe stub 16 and feed-water discharge line 4a.

Because a distal end of a conventional injection tap 20 may extend only to an inner surface of the feed-water discharge line 4a, a deposited material 22 may form within the distal end of the injection tap 20. The deposited material 22 may form at the injection point, as the ambient (i.e., low) temperature deposition solution is mixed with an intruding eddy flow of the high temperature, high velocity feed-water (ranging between 260 and 420° F. with a flow velocity of about 10-20 ft/sec) that may cause the deposition solution to break down into platinum ions which are then deposited within the inner distal end of the injection tap 20 (it is noted that sodium hexahydroxyplatinate, $Na_2Pt(OH)_6$, begins to break down at temperatures of 300-500° F.). Blockage of the injection tap 20 caused by the deposited material 22 may cause the positive displacement pumps to increase injection pressure to provide the specified injection flow rate. Pressure may increase to the design pressure of the deposition solution injector configuration 12, resulting in termination of an injection before all of the deposition solution is injected. This may cause a reduced amount of platinum to be deposited within the reactor 8, itself. Furthermore, blockage of the injection tap 20 may prevent performance of the next scheduled injection (typically done once per year), or require an unplanned reactor shutdown to remove the blockage.

In addition to blockage of the injection tap 20 by the deposited material 22 within the injection point, smearing of deposited material 22 may also occur along the inner surfaces of the feed-water discharge line 4a as the slowly flowing deposition solution is unable to escape the boundary layer and enter the bulk flow of the feed-water. The smearing may cause significant amounts of platinum ions to deposit along the inside of the feed-water discharge line 4a where it is not needed or desired, which may consequently reduce the amount of platinum that reaches the reactor 8.

SUMMARY

An insulated solution injector may include an outer tube, an inner tube arranged within the outer tube, an inboard end section at a distal end of the outer tube and the inner tube, and an outboard end section at an opposing proximal end of the outer tube and the inner tube. The outer tube may have a first outer surface and a first inner surface. The inner tube may have a second outer surface and a second inner surface, the first inner surface of the outer tube and the second outer surface of the inner tube defining an annular space, and the second inner surface of the inner tube defining a solution space. The inboard end section may include a base portion and a shield portion projecting from the base portion, the base portion having a hole extending therethrough, the hole being in communication with the solution space, and the shield portion having a groove extending along a length thereof from the base portion.

An injection system may include a pipe and an insulated solution injector penetrating the pipe. The pipe may have an interior surface defining a flow space, wherein the inboard end section of the insulated solution injector is within the flow space.

A method of injecting a solution into a high temperature liquid stream may include inserting an injector into a pipe configured to carry a flow of the high temperature liquid stream. The injector may be configured to deliver the solution into the high temperature liquid stream. The injector may include an outer tube and an inner tube arranged within the outer tube. The outer tube and the inner tube may define an annular space therebetween. The method may additionally include insulating the solution from the high temperature liquid stream while the solution is in the injector. The method may also include injecting the solution into the high temperature liquid stream. The method may further include shielding the solution from a full velocity of the flow during the injecting.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 3:
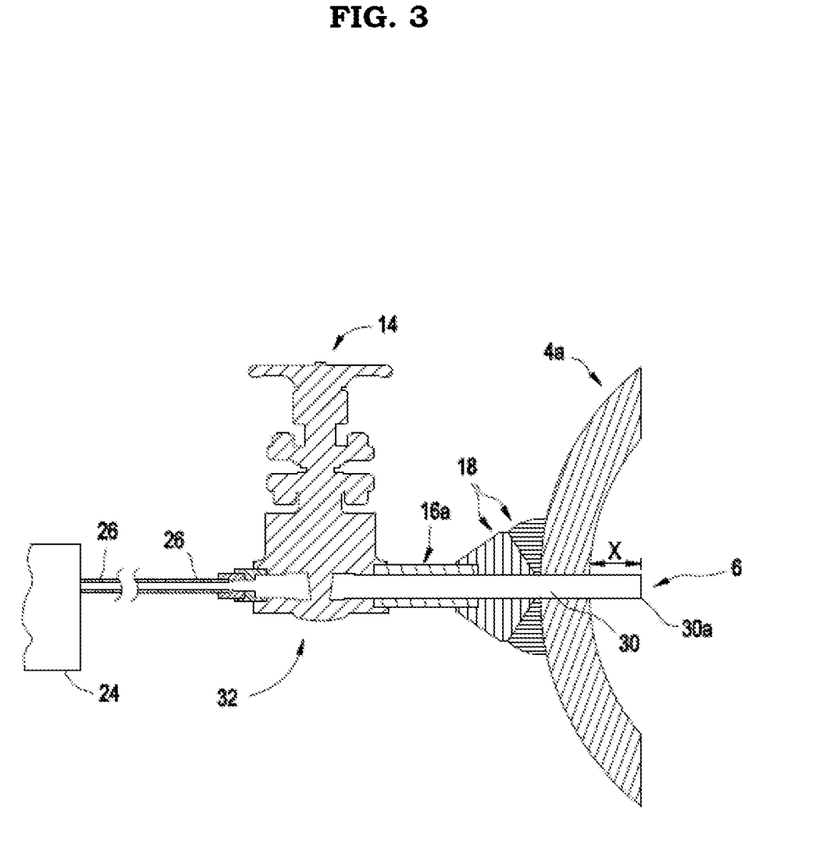
FIG. 3 is a side, cross-sectional view of a deposition solution injector configuration according to a non-limiting embodiment.

FIG. 3 is a side, cross-sectional view of a deposition solution injector configuration according to a non-limiting embodiment. Referring to FIG. 3, the deposition solution injector configuration 32 includes a hollow injector tube 30 with a distal end 30a that extends beyond the inner surface of the feed-water discharge line 4a. In particular, the distal end 30a of the injector tube 30 may extend beyond a determined boundary layer of the bulk flow of fluids traveling through the feed-water discharge line 4a. The depth of the boundary layer (and, the required length X of the distal end 30a of the injector tube 30) may vary depending upon the temperature and velocity of the feed-water. The depth of the boundary layer may also vary depending on the type of fluid flowing in the feed-water discharge line 4a (with potentially varying viscosity), the diameter and material of the feed-water discharge line 4a, as well as other parameters known to impact the Reynolds number (and resulting boundary layer depth) of fluid flowing in the feed-water discharge line 4a. It should therefore be understood that the length X should at least be long enough to extend beyond the boundary layer of the fluid flowing in the feed-water discharge line 4a.

The deposition solution injector configuration 32 also includes a wide diameter pipe stub 16a with an inner diameter that matches or slightly exceeds the outer diameter of the injector tube 30. The wide diameter pipe stub 16a provides support to minimize vibration stresses in the injector tube 30 caused by feed-water flow forces.

The inner diameter of the injector tube 30 may also contribute to potential blockage caused by deposited material, if the deposition material is heated to high temperatures (e.g., temperatures at or above the decomposition temperature of the deposition material) as it flows to the distal end 30a of the injector tube 30. For this reason, the inside diameter of the injector tube 30 should be sized to be sufficiently small, ensuring that the deposition solution flows relatively quickly through the hot region adjacent to the feed-water discharge line 4a. For a 50-120 $cm^3$/minute flow rate of deposition solution through the injector tube 30, a ⅛ inch inner diameter of the injector tube 30 would result in flow velocities of 3-9 inches/second. This would cause the deposition solution to be in the hot region for less than a second, thereby ensuring that the deposition solution does not degrade during this short period.

Figure 4A:
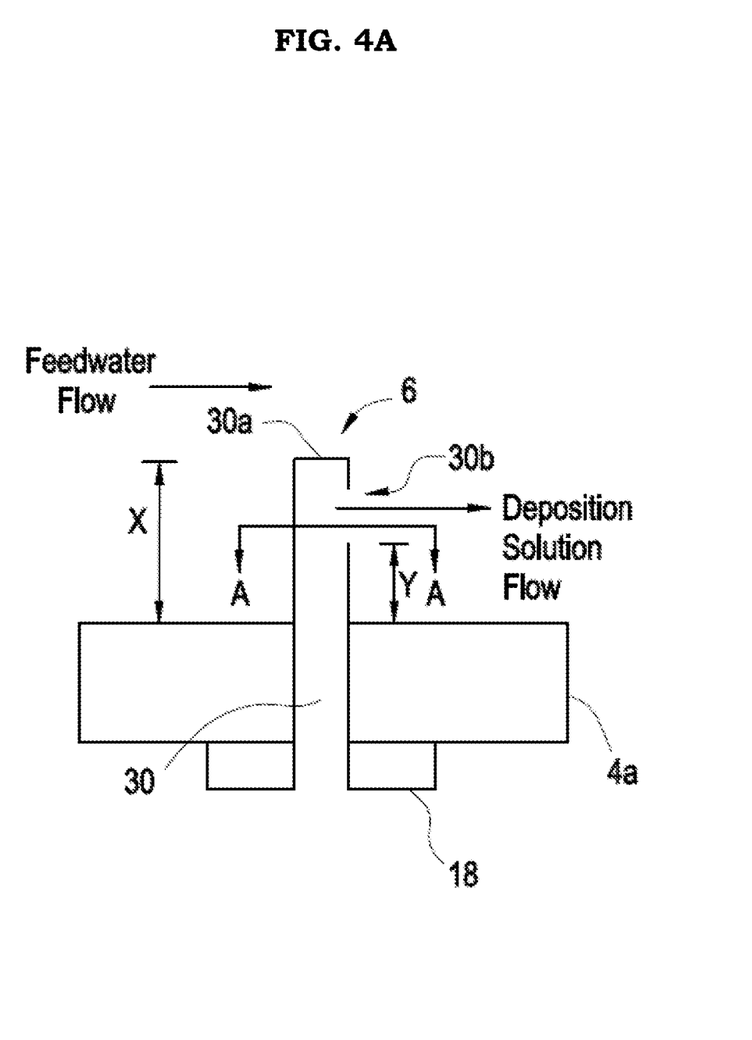
FIG. 4A is a side, cross-sectional view of a distal end of a deposition solution injector configuration according to a non-limiting embodiment.

FIG. 4A is a side, cross-sectional view of a distal end of a deposition solution injector configuration according to a non-limiting embodiment. Referring to FIG. 4A, the injector tube 30 is provided with an injection slot 30b located on a downstream side of the injector tube 30 (specifically, the injector slot 30b is downstream of the feed-water flow passing across the distal end 30a of the injector tube 30). By locating the injection slot 30b on the downstream side of the injector tube 30, the injection slot 30b is somewhat sheltered from the high pressure flow of the feed-water, thereby reducing the potential for the injector tube 30 to become clogged by deposited material.

The injector tube 30 should be adequately sized to ensure that the entire injection slot 30b extends beyond the boundary layer of the flowing feed-water, just as the distal end 30a of the injector tube 30 should extend beyond the boundary layer (as described in FIG. 3). This ensures that the deposition solution may be fully injected into the bulk flow of feed-water in the feed-water discharge line 4a without experiencing unnecessarily high deposition of platinum ions on the inside of the feed-water discharge line 4a. For this reason, length Y (the injector tube 30 length from the inner surface of the feed-water discharge line 4a to the opening of the injection slot 30b) must extend beyond the boundary layer of the feed-water. As described in FIG. 3, the boundary layer depth may vary depending on the temperature and velocity of the feed-water, the type of fluid flowing in the feed-water line, the diameter and material of the feed-water line, etc. As an example, for a 16 inch diameter feed-water discharge line 4a with flowing water in a range of 15-20 feet/second at a temperature of 260-420° F., a length Y of 1 inch is adequate to ensure that the entire injection slot 30b extends beyond the boundary layer of the fluids flowing in the feed-water discharge line 4a.

The size of the injection slot 30b itself may also impact the potential blockage of the injector tube 30. Therefore, the cross-sectional area of the injection slot 30b should be properly sized to ensure that the exit velocity of the deposition solution approximately matches the feed-water flow velocity, thereby ensuring that feed-water eddy flows do not enter the injection slot 30b and cause deposition and possible blockage.

The injection slot 30b may be located a distance below the terminus of the distal end 30a of the injector tube 30 to further shelter the injection slot 30b from the high pressures of the feed-water flow. However, the distal end 30a of the injector tube 30 should not extend too far beyond the depth of the feed-water boundary layer. By not extending the distal end 30a of the injector tube 30 too far beyond the location of the boundary layer, the risk of bending and damage to the injector tube 30 by the high velocity feed-water flow may be reduced or avoided. In a non-limiting embodiment, the length X (the full length of the distal end 30a of the injector tube 30 extending within the feed-water discharge line 4a) is not more than about 20% greater than the required length Y. In another non-limiting embodiment, the difference between X and Y is not more than one inch.

Figure 4B:
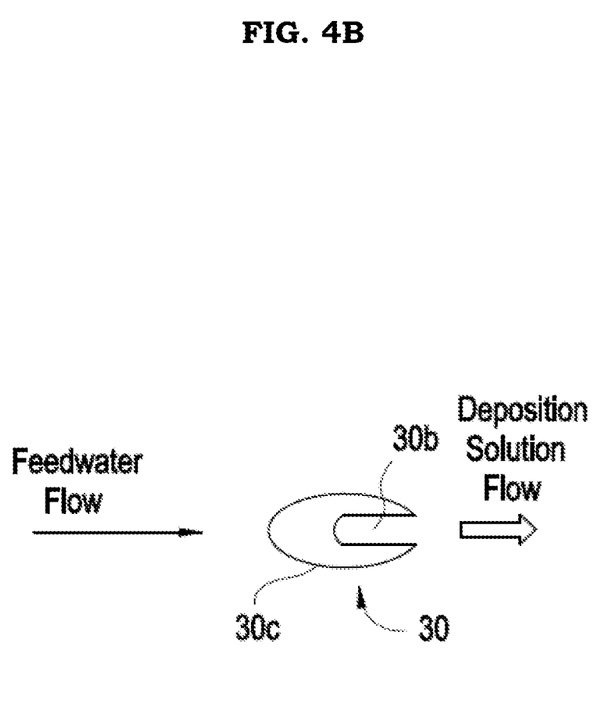
FIG. 4B is a top, cross-sectional view along line A-A of the deposition solution injector configuration of FIG. 4A.

FIG. 4B is a top, cross-sectional view along line A-A of the deposition solution injector configuration of FIG. 4A. As discussed in FIG. 4A, the injection slot 30b may be located on a downstream side of the injector tube 30 (the downstream side means downstream of the feed-water flow direction). The axial, cross-sectional profile 30c of the injector tube 30 may be a tapered, oval-shape with two acute ends (as shown in FIG. 4B) to hydrodynamically reduce feed-water fluid forces that may be experienced at the interface between the injection slot 30b and the bulk flow of the feed-water. The injection slot 30b may be located on the downstream-facing acute end of the injector tube 30 (as shown in FIG. 4B). The axial, cross-sectional profile 30c may also be circular, square, or other suitable shape, so long as the injection slot 30b is located on the downstream side of the injector tube 30 to minimize eddy flow of incident feed-water that may enter into the injector tube 30. Furthermore, premature decomposition and deposition of the solution may be reduced or prevented by hindering the transfer of heat to the solution during the passage of the solution through the injector to the feed-water. Such hindering of the transfer of heat may be achieved with an insulated solution injector.

Figure 5A:
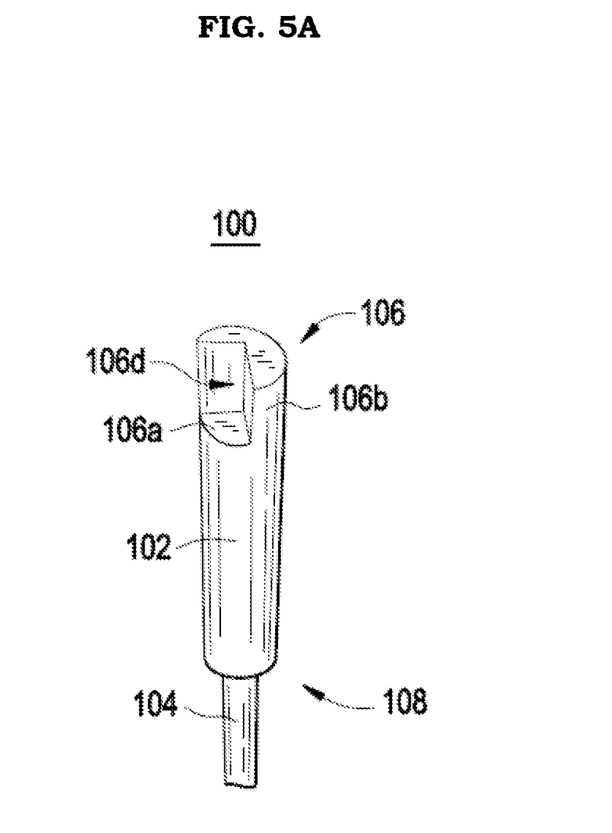
FIG. 5A is an upper perspective view of an insulated solution injector according to a non-limiting embodiment.
Figure 5B:
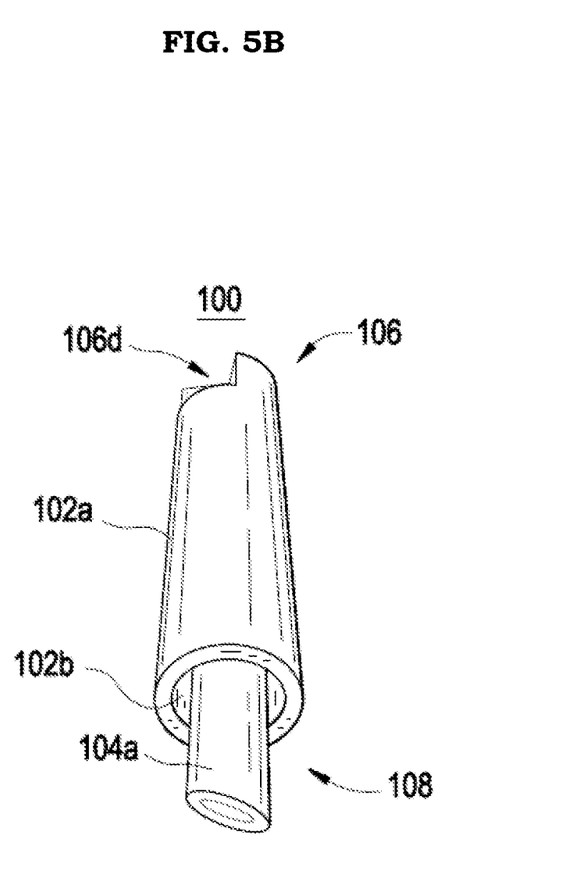
FIG. 5B is a lower perspective view of an insulated solution injector according to a non-limiting embodiment.
Figure 6:
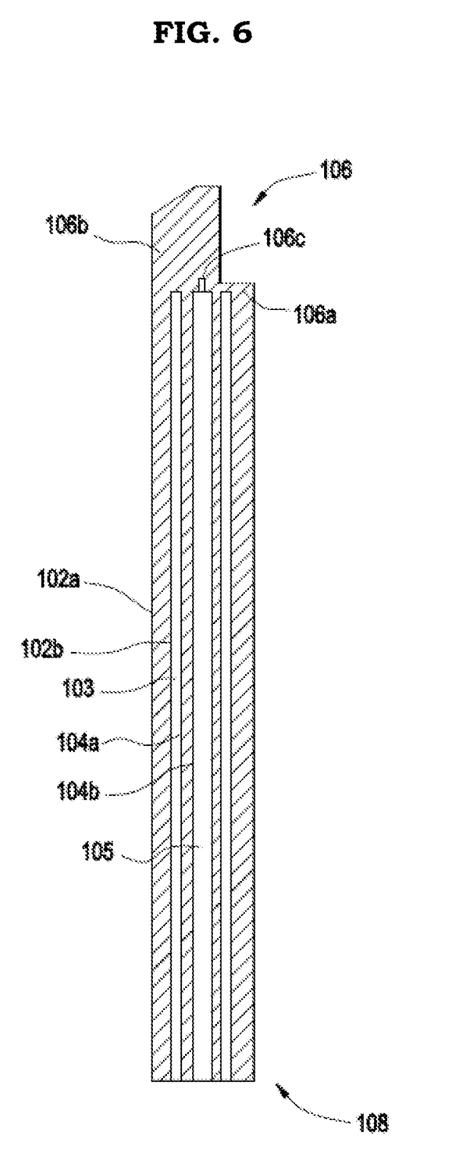
FIG. 6 is a side, cross-sectional view of an insulated solution injector according to a non-limiting embodiment.

FIG. 5A is an upper perspective view of an insulated solution injector according to a non-limiting embodiment. FIG. 5B is a lower perspective view of an insulated solution injector according to a non-limiting embodiment. FIG. 6 is a side, cross-sectional view of an insulated solution injector according to a non-limiting embodiment. Referring to FIGS. 5A-5B and 6, the insulated solution injector 100 includes an arrangement of an inner tube 104 within an outer tube 102. The outer tube 102 has a first outer surface 102a and a first inner surface 102b. The inner tube 104 has a second outer surface 104a and a second inner surface 104b.

The second outer surface 104a of the inner tube 104 is spaced apart from the first inner surface 102b of the outer tube 102. As a result, the first inner surface 102b of the outer tube 102 and the second outer surface 104a of the inner tube 104 define an annular space 103. An insulating layer may occupy the annular space 103 between the outer tube 102 and the inner tube 104. The insulating layer may be a gas layer. The inner tube 104 may be concentrically arranged within the outer tube 102. The second inner surface 104b of the inner tube 104 defines a solution space 105. The annular space 103 is isolated from the solution space 105.

An inboard end section 106 is at a distal end of the outer tube 102 and the inner tube 104. The inboard end section 106 includes a base portion 106a and a shield portion 106b projecting from the base portion 106a. The base portion 106a has a hole 106c extending therethrough. The hole 106c is in communication with the solution space 105. The hole 106c extending through the base portion 106a may have a diameter ranging from 0.1 to 0.3 inches. The shield portion 106b has a groove 106d extending along a length thereof from the base portion 106a. The groove 106d may be V-shaped and extend along an entire length of the shield portion 106b such that the inboard end section 106 has a "pac-man" shape based on a plan view. In such a case, the groove 106d of the shield portion 106b exposes a wedge-shaped area of the base portion 106a. The hole 106c extends through the wedge-shaped area of the base portion 106a. In another non-limiting embodiment, the groove 106d may be U-shaped or another suitable shape. A portion or more of the side of the shield portion 106b opposite to the groove 106d may be slanted or inclined. Additionally, the terminus of the shield portion 106b may be leveled.

An outboard end section 108 is at an opposing proximal end of the outer tube 102 and the inner tube 104 relative to the inboard end section 106. The outboard end section 108 may have an opening configured to allow atmospheric air to enter and circulate within the annular space 103 by natural convection. For instance, the insulated solution injector 100 may be installed such that the outboard end section 108 points upward to allow the higher temperature air circulating in the annular space 103 to escape by natural convection. Alternatively, the annular space 103 may be sealed, wherein the annular space 103 is filled with a gas layer or rendered as a vacuum.

Although the insulated solution injector 100 is shown in the drawings as being in a linear form, it should be understood that example embodiments are not limited thereto. For instance, the insulated solution injector 100 may alternatively be in a curved form. As an example of a curved form, the insulated solution injector 100 may have an inboard end section 106 that is straight to facilitate insertion into a pipe (e.g., feed-water pipe), while the outboard end section 108 may be curved to accommodate a particular configuration (and/or to maneuver around an adjacent structure), vice versa, or both curved based on situational needs.

Figure 7:
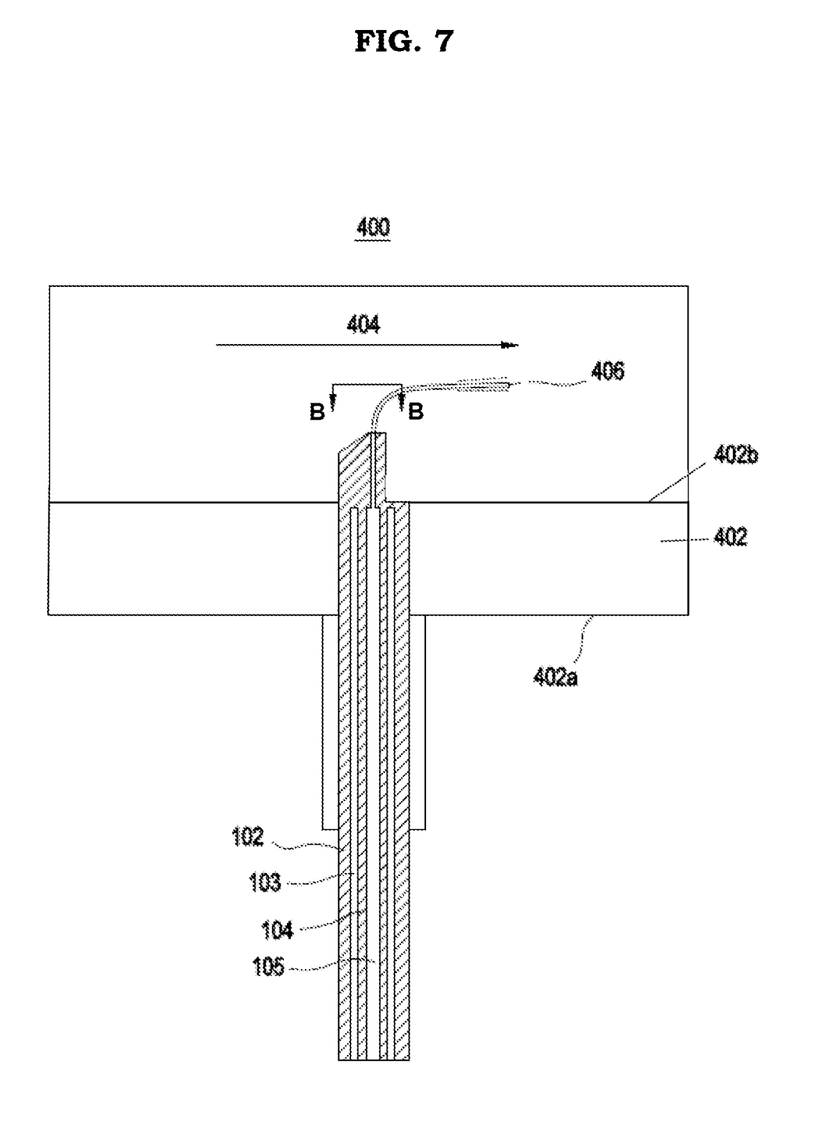
FIG. 7 is a side, cross-sectional view of an insulated injection system according to a non-limiting embodiment.
Figure 8:
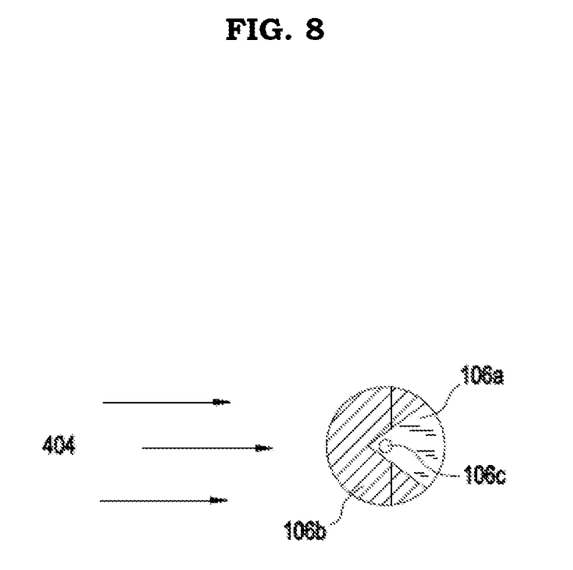
FIG. 8 is a top view along line B-B of the insulated solution injector of the insulated injection system of FIG. 7.

FIG. 7 is a side, cross-sectional view of an insulated injection system according to a non-limiting embodiment. FIG. 8 is a top view along line B-B of the insulated solution injector of the insulated injection system of FIG. 7. Referring to FIGS. 7-8, an injection system 400 includes a pipe 402 having an exterior surface 402a and an interior surface 402b. The pipe 402 may be a feed-water pipe. The interior surface 402b of the pipe 402 defines a flow space therein for a liquid stream (e.g., feed-water). An insulated solution injector 100 penetrates the pipe 402. Although the insulated solution injector 100 is shown in the drawings as penetrating an underside of the pipe 402, it should be understood that example embodiments are not limited thereto. For instance, the insulated solution injector 100 may alternatively penetrate an upper-side or top-side of the pipe 402. With an upper-side or top-side penetration of the pipe 402, the air that is being heated in the annular space 103 by the pipe 402 and/or the liquid stream can escape relatively easily by natural convection.

The insulated solution injector 100 may be as described in connection with FIGS. 5A-5B and 6. In particular, the insulated solution injector 100 includes an outer tube 102 having a first outer surface 102a and a first inner surface 102b. An inner tube 104 is arranged within the outer tube 102. The inner tube 104 having a second outer surface 104a and a second inner surface 104b. The first inner surface 102b of the outer tube 102 and the second outer surface 104a of the inner tube 104 define an annular space 103. The second inner surface 104b of the inner tube 104 defines a solution space 105.

An inboard end section 106 is at a distal end of the outer tube 102 and the inner tube 104. The inboard end section 106 is arranged so as to be within the flow space of the pipe 402. The inboard end section 106 includes a base portion 106a and a shield portion 106b projecting from the base portion 106a. The base portion 106a has a hole 106c extending therethrough. The flow space of the pipe 402 is in communication with the solution space 105 via the hole 106c. The shield portion 106b has a groove 106d extending along a length thereof from the base portion 106a. An outboard end section 108 is at an opposing proximal end of the outer tube 102 and the inner tube 104 relative to the inboard end section 106.

The insulated solution injector 100 may extend into the pipe 402 about 5 to 15% of an inside diameter of the pipe 402. For instance, the insulated solution injector 100 may extend into the pipe 402 about 1 to 2 inches beyond the interior surface 402b of the pipe 402.

A method of injecting a solution 406 into a high temperature liquid stream 404 includes inserting an injector 100 into a pipe 402 configured to carry a flow of the high temperature liquid stream 404. The injector 100 is configured to deliver the solution 406 into the high temperature liquid stream 404. The injector 100 includes an outer tube 102 and an inner tube 104 arranged within the outer tube 102. The outer tube 102 and the inner tube 104 define an annular space 103 therebetween. The method additionally includes insulating the solution 406 from the high temperature liquid stream 404 while the solution 406 is in the injector 100. The method also includes injecting the solution 406 into the high temperature liquid stream 404 while insulating the solution 406 still within the injector 100. The method further includes shielding the solution 406 from a full velocity of the flow during the injecting.

The inserting may include positioning the injector 100 to facilitate delivery of the solution 406 beyond the boundary layer of the flow of the high temperature liquid stream 404. The high temperature liquid stream 404 may be a high temperature water stream (e.g., feed-water stream).

The insulating may include providing a gas or a vacuum in the annular space 103. For instance, the insulating may include providing air (e.g., atmospheric air) as the gas in the annular space 103. The air in the annular space 103 may circulate by natural convention such that the warmer internal air exits while the cooler external air enters the annular space 103. As a result, the solution 406 in the solution space 105 is relatively insulated from the high temperature environment of the pipe 402 and its contents as the solution 406 travels from the outboard end section 108 to the inboard end section 106 where the solution 406 is injected into the high temperature liquid stream 404.

The injecting may include delivering a noble metal precursor as the solution 406 into the high temperature liquid stream 404. In a non-limiting embodiment, the injecting may include delivering a platinum precursor into the high temperature liquid stream 404. For instance, the injecting may include delivering sodium hexahydroxyplatinate ($Na_2Pt(OH)_6$) into the high temperature liquid stream 404.

In view of the insulated solution injector, the injection system, and the method of injecting herein, the solution may be kept to a temperature below its decomposition temperature while the solution is within the injector. Accordingly, the decomposition of the solution (e.g., $Na_2Pt(OH)_6$) and the resulting deposition of its constituents (e.g., Pt) within the injector may be reduced or prevented, thereby decreasing or precluding the occurrence of a blockage.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An insulated solution injector comprising:
an outer tube having a first outer surface and a first inner surface;
an inner tube arranged within the outer tube, the inner tube having a second outer surface and a second inner surface, the first inner surface of the outer tube and the second outer surface of the inner tube defining an annular space, the second inner surface of the inner tube defining a solution space;
an inboard end section at a distal end of the outer tube and the inner tube, the inboard end section capping a distal end of the annular space, the inboard end section including a base portion and a shield portion extending longitudinally from a distal end of the base portion, the shield portion having a groove extending a length of the shield portion from the distal end of the base portion, the base portion having a hole extending therethrough, the hole being in fluidic communication with the solution space and the groove, the hole opening up to the groove to permit injection of solution along a length of the groove, the hole being between the solution space and the groove, a majority of the groove being downstream from the hole such that the groove and, the solution space do not overlap based on a flow direction of the solution; and
an outboard end section at an opposing proximal end of the outer tube and the inner tube.

2. The insulated solution injector of claim 1, wherein the second outer surface of the inner tube is spaced apart from the first inner surface of the outer tube.

3. The insulated solution injector of claim 1, wherein the inner tube is concentrically arranged within the outer tube.

4. The insulated solution injector of claim 1, wherein the annular space is isolated from the solution space.

5. The insulated solution injector of claim 1, wherein the hole extending through the base portion has a diameter ranging from 0.1 to 0.3 inches.

6. The insulated solution injector of claim 1, wherein the groove of the shield portion exposes a wedge-shaped area of the base portion, the hole extending through the wedge-shaped area of the base portion.

7. The insulated solution injector of claim 1, further comprising:
an insulating layer occupying the annular space between the outer tube and the inner tube.

8. The insulated solution injector of claim 7, wherein the insulating layer is a gas layer.

9. The insulated solution injector of claim 1, wherein the hole is not overlapped by the shield portion.

10. The insulated solution injector of claim 1, wherein the shield portion is a terminal part of the outer tube.

11. The insulated solution injector of claim 1, wherein the shield portion extends beyond the inner tube.

12. The insulated solution injector of claim 1, wherein the inboard end section is disposed directly at the distal end of the outer tube.

13. The insulated solution injector of claim 1, wherein the base portion is a planar structure that contacts the outer tube and the inner tube.

14. The insulated solution injector of claim 1, wherein the base portion is a planar structure that overlaps the annular space and the solution space.

15. The insulated solution injector of claim 1, wherein the outer tube and the inboard end section enclose the distal end of the inner tube.

16. The insulated solution injector of claim 1, wherein a longitudinal axis of the hole is aligned with a longitudinal axis of the solution space.

17. An insulated solution injector comprising:
an outer tube having a first outer surface and a first inner surface;
an inner tube arranged within the outer tube, the inner tube having a second outer surface and a second inner surface, the first inner surface of the outer tube and the second outer surface of the inner tube defining an annular space, the second inner surface of the inner tube defining a solution space;
an inboard end section at a distal end of the outer tube and the inner tube, the inboard end section capping a distal end of the annular space, the inboard end section including a base portion and a shield portion extending longitudinally from a distal end of the base portion, the shield portion having a groove extending a length of the shield portion from the distal end of the base portion, the base portion having a hole extending therethrough, the hole being in fluidic communication with the solution space and the groove, the hole opening up to the groove to permit injection of solution along a length of the groove; and
an outboard end section at an opposing proximal end of the outer tube and the inner tube, the outboard end section having an opening configured to allow atmospheric air to enter and circulate within the annular space by natural convection.

18. An injection system comprising:
a pipe having an exterior surface and an interior surface, the interior surface defining a flow space; and
an insulated solution injector penetrating the pipe, the insulated solution injector including
an outer tube having a first outer surface and a first inner surface;
an inner tube arranged within the outer tube, the inner tube having a second outer surface and a second inner surface, the first inner surface of the outer tube and the second outer surface of the inner tube defining an annular space, the second inner surface of the inner tube defining a solution space;
an inboard end section at a distal end of the outer tube and the inner tube, the inboard end section capping a distal end of the annular space, the inboard end section being within the flow space of the pipe, the inboard end section including a base portion and a shield portion extending longitudinally from a distal end of the base portion, the shield portion having a groove extending a length of the shield portion from the distal end of the base portion, the base portion having a hole extending therethrough, the flow space being in fluidic communication with the solution space via the hole, the hole opening up to the groove to permit injection of solution along a length of the groove, the groove facing a downstream side of the flow space in the pipe, the hole being between the solution space and the groove, a majority of the groove being downstream from the hole such that the groove and the solution space do not overlap based on a flow direction of the solution; and an outboard end section at an opposing proximal end of the outer tube and the inner tube.

19. The injection system of claim 18, wherein the insulated solution injector extends into the pipe about 5 to 15% of an inside diameter of the pipe.

20. The injection system of claim 18, wherein the insulated solution injector extends into the pipe about 1 to 2 inches beyond the interior surface of the pipe.

* * * * *